United States Patent [19]
Auerbach

[11] Patent Number: 5,096,951
[45] Date of Patent: Mar. 17, 1992

[54] COLOR STABILIZED POLYOXYMETHYLENE MOLDING COMPOSITIONS

[75] Inventor: Andrew Auerbach, Livingston, N.J.

[73] Assignee: Hoechst Celanese Corporation, Somerville, N.J.

[21] Appl. No.: 626,789

[22] Filed: Dec. 13, 1990

[51] Int. Cl.$^5$ ............................................. C08K 5/526
[52] U.S. Cl. ..................................... 524/106; 524/148; 524/230; 524/291; 524/593; 524/100
[58] Field of Search ............... 524/148, 106, 400, 593, 524/230, 291, 100

[56] References Cited

U.S. PATENT DOCUMENTS

| | | | |
|---|---|---|---|
| 3,236,929 | 2/1966 | Jupa et al. | 528/485 |
| 3,484,400 | 12/1969 | Halek | 524/593 |
| 3,743,614 | 7/1973 | Wolters et al. | 524/593 |
| 3,849,370 | 11/1974 | Monagawa et al. | 524/106 |
| 4,024,105 | 5/1977 | Sextro et al. | 524/593 |
| 4,342,680 | 8/1982 | Sugio et al. | 524/593 |
| 4,663,079 | 5/1987 | Yamaguchi et al. | 524/106 |
| 4,812,500 | 3/1989 | Hayden | 524/148 |

OTHER PUBLICATIONS

Hostanox TM VP OSP 1, Polymer Additives Data Sheet, Hoechst Celanese Corp.

*Primary Examiner*—Veronica P. Hoke
*Attorney, Agent, or Firm*—Nixon & Vanderhye

[57] ABSTRACT

A polyoxymethylene molding composition which exhibits improved ambient and heat aged color stability includes a metal deactivator and calcium hydroxystearate. One preferred composition of the invention includes: (a) greater than about 95 weight percent of polyoxymethylene, (b) between about 0.01 to about 0.1 weight percent of 3 salicyloyl-amido-1,2,4 triazole or tris-2-tert.butyl- 4-thio-(2'methyl-4'hydroxy-5'tert.butyl) phenyl-5-methyl phenyl phosphite, (c) between about 0.015 to about 0.4 weight percent of 2,4,6-triamino-sym-triazine, (d) between about 0.25 to about 1.0 weight percent of tetrakis(methylene-(3,5-di-tert-butyl- 4-hydroxyhydrocinnamate)) methane, (e) between about 0.05 to about 0.2 weight percent of calcium 12-hydroxystearate, and (f) between about 0.1 to about 0.3 weight percent of N-N'-ethylenebisstearamide. Due to their enhanced color stability, the compositions of this invention find particular utility as molded automobile components.

28 Claims, No Drawings

COLOR STABILIZED POLYOXYMETHYLENE MOLDING COMPOSITIONS

FIELD OF INVENTION

The present invention relates generally to molding compositions of polyoxymethylene. More specifically, the invention relates to polyoxymethylene molding compositions, employing at least one metal deactivator, that exhibit improved color stability.

BACKGROUND OF THE INVENTION

Oxymethylene polymers having recurring —CH$_2$O— units have been known for many years. They may be prepared, for example, by the polymerization of anhydrous formaldehyde or by the polymerization of trioxane, which is a cyclic trimer of formaldehyde.

The usefulness of oxymethylene polymers in molding compositions has also been known for many years. However, molding compositions comprising polyoxymethylene are, unfortunately, well known for their propensity to discolor over time either at ambient temperatures or at elevated temperatures. And, as is also well known, color retention of polyoxymethylene molding compositions is a necessary criteria when polyoxymethylene compositions are employed in a vast majority of applications (e.g., as automotive components).

Over the years, many attempts have been made to discover additives for polyoxymethylene molding compositions which effectively suppress color reactions (i.e., discoloration). For example, U.S. Pat. No. 3,204,014 to Green (the entire content of which is expressly incorporated herein by reference) discloses that polyoxymethylene compositions comprising vinylpyrrolidone, a phenolic antioxidant, and a dialkyl ester of 3,3'-thiodipropionic acid exhibit good color retention.

In addition, it is known from U.S. Pat. No. 3,488,303 to Heinz (the entire content of which is expressly incorporated herein by reference) that the problem of discoloration can be alleviated to a certain extent by the incorporation of a lanthanide salt in a polyoxymethylene composition.

While the above-noted polyoxymethylene formulations do provide some level of color stability, additional improvements in this regard are still needed. This is especially true with the more recent developments in thermally stable polyoxymethylene compositions. These new compositions, which may comprise additional stabilizer ingredients, provide further color reaction complications due to their additional ingredients. See, for example, U.S. Pat. No. 4,727,106 to Paul et al, the entire content of which is expressly incorporated herein by reference.

Further, and in addition to the prevention of discoloration, any commercially successful polyoxymethylene composition must also exhibit desirable processability characteristics. That is, during molding of parts, the composition must be capable of releasing easily from the mold without forming significant amounts of mold deposits. Otherwise, the molded part itself may not be useable due to improper and/or inconsistent part surfaces or unacceptably high surface gloss levels (particularly where parts having low surface gloss levels are desired).

Thus, it is towards achieving improved color stabilized polyoxymethylene compositions, via incorporation of an easily processable stabilizer additive, that the present invention is directed.

SUMMARY OF THE INVENTION

Broadly, the present invention is a polyoxymethylene molding composition which includes at least one metal deactivator. More specifically, the compositions of the present invention that exhibit improved ambient and heat aged color stability include polyoxymethylene and at least one of the following metal deactivators: 3 salicyloylamido-1,2,4 triazole or tris-2-tert.butyl-4-thio-(2'methyl-4'hydroxy-5'tert.butyl) phenyl-5-methyl phenyl phosphite.

In addition to the employment of at least one of the above-identified metal deactivators, the polyoxymethylene molding compositions of the present invention necessarily include calcium hydroxystearate.

Preferably, the compositions of the present invention will also include other components, for example, known ultraviolet (UV) light stabilizers, antioxidants, colorants, antistatic ingredients, lubricants, as well as fillers and/or reinforcing agents (i.e., depending upon the end use application).

The compositions of this invention exhibit excellent color stability, particularly when exposed to ambient and elevated temperatures over prolonged time periods, and moreover, are easily processable without undesirable mold deposits being formed. As a result of these exceptional properties, the compositions of this invention find particular utility in automotive parts, for example. Of course, the compositions of this invention may be employed in any end use environment where color stabilization characteristics are desirable in conjunction with the physical properties and other attributes of polyoxymethylene.

These advantages, and others, will become more apparent from the detailed description of the compositions according to the present invention which follows.

DETAILED DESCRIPTION OF THE PREFERRED EXEMPLARY EMBODIMENTS

By employing the additives that will be described in further detail below, polyoxymethylene molding compositions exhibit improved color stability under either ambient or elevated temperature conditions over extended periods of time.

The constituents of the novel compositions of the present invention will be discussed separately in greater detail below.

A. Oxymethylene Polymers

In general, the oxymethylene polymers used in the compositions of the present invention are characterized as having recurring oxymethylene groups or units, i.e., —CH$_2$O—. The term oxymethylene polymer or polyoxymethylene as used herein is intended to include any oxymethylene polymer having recurring —CH$_2$O— units and which comprises at least 50% of such recurring units, for example, oxymethylene homopolymer, copolymers, terpolymers, and the like.

Typically, the homopolymers are prepared by the polymerization of anhydrous formaldehyde or by the polymerization of trioxane which is a cyclic trimer of formaldehyde. For example, high molecular weight polyoxymethylenes have been prepared by polymerizing trioxane in the presence of certain fluoride catalysts such as antimony fluoride, and may also be prepared in high yields and at rapid reaction rates by the use of catalysts comprising boron fluoride coordinate complexes with organic compounds, as described in U.S. patent application Ser. No. 691,143, filed Oct. 21, 1957, by Hudgin and Berardinelli, now abandoned.

A preferred group of polymers intended to be utilized in accordance with this invention are oxymethylenecyclic ether copolymers having a structure comprising recurring units having the formula $$(-O-CH_2-(C)_n-)$$

wherein n is an integer from zero to 5 and wherein n is zero in 60 to 99.6 percent of the recurring units.

A preferred class of copolymers are those having a structure comprising recurring units having the formula $(-O-CH_2-(CH_2)_n-)$ wherein n is an integer from zero to 2 and wherein n is zero in 60 to 99.6 percent of the recurring units. These copolymers are prepared by copolymerizing trioxane with a cyclic ether having the structure $$\begin{array}{c} CH_2 - O \\ | \quad\quad | \\ CH_2-(OCH_2)_n \end{array}$$

where n is an integer from zero to two.

Among the specific cyclic ethers which may be used are ethylene oxide, 1,3-dioxolane, 1,3,5-trioxepane, 1,3-dioxane, trimethylene oxide, pentamethylene oxide, 1,2-propylene oxide, 1,2-butylene oxide, neopentyl formal, pentaerythritol diformal, paraldehyde, tetrahydrofuran, and butadiene monoxide.

The preferred catalysts used in the preparation of the desired copolymers are the boron fluoride coordinate complexes with organic compounds in which oxygen or sulfur is the donor atom. The coordination complexes of boron fluoride may, for example, be a complex with a phenol, an ether, an ester, or a dialkyl sulfide. Boron fluoride dibutyl etherate, the coordination complex of boron fluoride with dibutyl ether, is the preferred coordination complex. The boron fluoride complex with diethyl ether is also very effective. Other boron fluoride complexes which may be used are the complexes with methyl acetate, with ethyl acetate, with phenyl acetate, with dimethyl ether, with methylphenyl ether and with dimethyl sulfide.

The coordination complex of boron fluoride should be present in the polymerization zone in amounts such that its boron fluoride content is between about 0.0001 and about 1.0 weight percent based on the weight of the monomers in the polymerization zone. Preferably, amounts between about 0.003 and about 0.03 weight percent should be used in a continuous process.

The preferred catalyst used in preparing the oxymethylene copolymer is the aforementioned boron trifluoride as discussed in U.S. Pat. No. 3,027,352 issued to Walling et al, the entire content of which is incorporated herein by reference. Reference may be made to this patent for further information concerning the polymerization conditions, amount of catalyst employed, etc.

The monomers in the reaction zone are preferably anhydrous or substantially anhydrous. Small amounts of moisture, such as may be present in commercial grade reactants or may be introduced by contact with atmospheric air, will not prevent polymerization but should be essentially removed for optimum yields.

As a specific example, the trioxane, cyclic ether and catalyst may be dissolved in a common anhydrous solvent, such as cyclohexane and permitted to react in a sealed reaction zone. The temperature in the reaction zone may very from about 0° C. to about 100° C. The period of reaction may vary from about 5 minutes to about 72 hours. Pressures from subatmospheric to about 100 atmospheres, or more may be used, although atmospheric pressure is preferred.

Relatively minor amounts of the cyclic ether other than trioxane used in the copolymerization reaction generally disappear completely from the reaction mixture. The required ratio of trioxane to cyclic ether in the reaction mixture may therefore be roughly predetermined for a desired mole ratio in the polymer by assuming that all of the cyclic ether is used up and by assuming a particular conversion level from previous experience under substantially comparable conditions.

The chemical constitution of the cyclic ether must also be considered. Thus, 1,3-dioxolane contains both an oxymethylene group and a oxyethylene group. Its incorporation into the copolymer molecule introduces oxyethylene groups into the polymer molecule.

In general, the cyclic ether is present in the reaction mixture in the amounts between about 0.2 and about 30 mole percent, based on the total moles of monomer. The optimum proportion will depend on the particular copolymer desired, the expected degree of conversion, and the chemical constitution of the cyclic ether used.

The copolymer produced from the preferred cyclic ethers in accordance with this invention have a structure substantially comprising oxymethylene and oxyethylene groups in a ratio from about 1000:1 to about 6:1, preferably 250:1 to 1.5:1.

Upon completion of the polymerization reaction, it is desirable to neutralize the activity of the polymerization catalyst since prolonged contact with the catalyst degrades the polymer. The polymerization product may be treated with an aliphatic amine, such as tri-n-butylamine, in stoichiometric excess over the amount of free catalyst in the reaction product, and preferably in an organic wash liquid which is a solvent for unreacted trioxane. Or, if desired, the reaction product may be washed with water which neutralizes catalyst activity. A detailed description of the methods of neutralizing catalyst activity may be found in U.S. Pat. No. 2,989,509 of Hudgin et al, the entire content of which is incorporated herein by reference. A preferred oxymethylene copolymer is commercially available from Hoechst Celanese Corporation under the designation Celcon ® acetal copolymer.

The oxymethylene copolymers that are employed in the present invention are thermoplastic materials having a melting point of at least 150° C., and normally are millable or processable at a temperature of about 200° C. Teey have a number average molecular weight of at least 10,000. The preferred oxymethylene polymers have an inherent viscosity of at least 1.0 (measured at 60° C. in a 0.1 weight percent solution in p-chlorophenol containing 2 weight percent of alpha-pinene).

The oxymethylene copolymer component preferably is an oxymethylene copolymer that has been preliminarily stabilized to a substantial degree. Such stabilizing technique may take the form of stabilization by degradation of the molecular ends of the polymer chain to a point where a relatively stable carbon-to-carbon linkage exists at each end. For example, such degradation may be effected by hydrolysis as disclosed in commonly-assigned U.S. Pat. No. 3,219,623 issued to Beradinelli, the entire content of which is incorporated herein by reference.

If desired, the oxymethylene copolymer may be end-capped by techniques known to those skilled in the art. A preferred end-capping technique is accomplished by acetylation with acetic anhydride in the presence of sodium acetate catalyst.

B. Metal Deactivators

The novel oxymethylene compositions of the present invention necessarily include at least one metal deactivator. The metal deactivators may be present in the compositions of this invention in an amount of between about 0.01 to 1.0 weight percent (based on the total weight of the composition), and preferably between about 0.01 to about 0.05 weight percent.

The metal deactivators which may be successfully employed in the present invention are commercially available. For example, one such metal deactivator is 3 salicyloylamido-1,2,4 triazole, which is commerically available from Witco Corporation, Argus Division under the tradename MARK 1475, and is supplied as an amorphous powder.

Another particularly preferred metal deactivator for use in the present invention is tris-2-tert.butyl-4-thio-(2'methyl-4'hydroxy-5'tert.butyl) phenyl-5- methyl phenyl phosphite. Such a compound is commercially available from Hoechst Celanese under the tradename Hostanox VP OSP 1, which is supplied as a fine, white, free-flowing amorphous powder. This product has a molecular weight of 1103, a softening point in accordance with DIN 1995 of about 110° C., and a specific gravity (DGF-M-III 2A (57)) at 20° C. of about 1.10.

C. Calcium Hydroxystearate

The novel oxymethylene compositions of the present invention necessarily include calcium hydroxystearate. The calcium hydroxystearate may be present in the compositions of this invention in an amount of between about 0.01 to 1.0 weight percent (based on the total weight of the composition), and preferably between about 0.05 to about 0.15 weight percent.

A calcium hydroxystearate which may be successfully employed in the present invention is calcium 12-hydroxystearate and is commercially available from Kosei Co., Ltd. under the tradename CS-6, and is supplied in the form of a white powder, having a melting point of about 140° C.

D. Other Additives

The additives which can be successfully employed in the practice of this invention may be generally classified as antioxidants, UV stabilizers, free radical scavengers, colorants, antistatic ingredients, and other additives (e.g., lubricants, fillers, reinforcing agents and the like).

An antioxidant is preferably present in the compositions of this invention in an amount of between about 0.2 to 1.0 weight percent (based on the total weight of the composition), and preferably between about 0.4 to about 0.6 weight percent.

The antioxidants which may be successfully employed in the present invention are commercially available. For example, one such antioxidant is tetrakis(methylene(3,5-di-tert-butyl-4-hydroxyhydrocinnamate)) methane which is commercially available from Ciba Geigy under the tradename Irganox 1010. Similarly, another such antioxidant is 1,6 hexamethylene bis(3,5-di-t-butyl-4-hydroxy hydrocinnamate) which is commercially available from Ciba Geigy under the tradename Irganox 259. Other similar antioxidants or blends thereof may also be successfully employed in accordance with the present invention (e.g., Triethyleneglycol bis-3(3-t-butyl-4-hydroxy-5-methylphenol) propionate which is commercially available from Ciba Geigy under the tradename Irganox 245; 2,6 di-t-butyl-4-methylphenol which is commercially available from Borg Warner under the tradename Ultranox 226; 2,2'-methylene bis(4-ethyl-6-t-butylphenol) which is commercially available from Ashland Chemical under the tradename CAO-5; 1,3,5 tris (4-t-butyl-3-hydroxy-2,6-dimethylbenzyl) 1,3,5 triazine-2,4,6 (1H,3H,5H) trione under the tradename Cyanox 1790; 1,1,3 tris (2 methyl-4-hydroxy-5-t-butylphenyl) butane which is commercially available from ICI Americas under the tradename Topanol CA).

A UV light stabilizer may also be present in the composition in an amount not greater than about 2.0 weight percent, and preferably, not greater than about 1.0 weight percent (based upon the total weight of the composition). In this regard, more than one UV light stabilizer may be present in the polyoxymethylene compositions of this invention. Typical UV light stabilizers which may be employed in the present invention are 2-(2-hydroxy-5-t-octylphenyl)-benzotriazole (commercially available from Cyanamid Company under the tradename Cyasorb ® UV 5411) and bis(2,2,6,6-tetramethyl-4-piperidinyl)sebacate (commercially available from Ciba-Geogy under the tradename Tinuvin 770). Other similar light stabilizers may also be successfully employed in accordance with the present invention (e.g., 2 hydroxy-4-methoxybenzophenone commercially available from American Cyanamid under the tradename Cyasorb UV-2; 2 hydroxy-4-n-octoxybenzophenone commercially available from American Cyanamid under the tradename Cyasorb UV-531; 2 (2'-hydroxy-5'-methylphenyl) benzotriazole commercially available from Ciba-Geigy under the tradename Tinuvin P; Bis (1,2,2,6,6-pentamethyl-4-piperidinyl) (3,5,-di-t-butyl-4-hydroxybenzyl) Butylpropanedioate commercially available from Ciba Geigy under the tradename Tinuvin 144).

A free formaldehyde scavenger may also be present in the compositions of this invention. One particularly suitable free formaldehyde scavenger is 2,4,6-triamino-symtriazine commercially available from American Cyanamid, which is commonly referred to as Melamine. The free formaldehyde scavenger will be present in the composition in an amount between about 0.015 to about 0.4 weight percent (based upon the total weight of the composition), and more preferably in an amount between about 0.015 to about 0.045 weight percent. Other similar formaldehyde scavengers may also be successfully employed in accordance with the present invention (e.g., Cyanoguanidine which is commercially available from Phillip Brothers under the tradename Dicy; 2,4,6-diamino-6-phenyl-1,3,5 triazine which is commercially available from Japan Catalytic Chemical under the tradename Benzoguanamine; Ternary polymerization of caprolactam, hexamethylene diamine adipate and hexamethylene diamine sebacate (nylon 6/6,6/6,10 terpolymer) which is commercially available from Du Pont under the tradename Elvamide 8063; Polycondensation product of polymeric fatty acids with aliphatic diamines which is commercially available from Sherex under the tradename Eurelon 975).

A lubricant may also be present in the compositions of this invention. One particularly suitable lubricant is N-N'-ethylenebisstearamide commercially available from Glyco Chemical (now part of Lonza) under the tradename Acrawax C, and having a melting point of about 140°–145° C. and a molecular weight of about 580. The lubricant may be present in the composition in an amount between about 0.05 to about 1.0 weight percent (based upon the total weight of the composition), and more preferably in an amount between about 0.1 to about 0.3 weight percent.

Surprisingly, it has been found that by incorporating an effective amount of a metal deactivator in the polyoxymethylene compositions noted above and calcium hydroxystearate, enhanced color stabilization properties ensue. Although the chemical interaction of the metal deactivators and calcium hydroxystearate in the compositions of the present invention is not fully understood at this time, it is believed that the metal deactivators have a chelating or metal deactivation effect which suppresses the discoloration of the resulting polyoxymethylene compositions.

The molding compositions of the present invention exhibit ambient and heat-aged color stability as well as thermal stability (e.g., improved Hunter Color values, and reduced thermal degradation rates (Kd values)). Furthermore, the compositions of the present invention exhibit an increase in Hunter Color b value (as described below) of less than about 8.0 after about seven days at about 113° C., and a thermal degradation rate (as described below) of about 0.028 or less.

One particularly preferred composition according to this invention comprises, based upon the total weight of the composition, (a) greater than about 95 weight percent (preferably about 97 weight percent) of polyoxymethylene, (b) between about 0.01 to about 0.1 weight percent (preferably about 0.02 weight percent) of 3 salicyloylamido-1,2,4 triazole or tris-2-tert.butyl-4-thio-(2'methyl-4'hydroxy-5'tert.butyl) phenyl-5-methyl phenyl phosphite, (c) between about 0.015 to about 0.4 weight percent (preferably about 0.04 weight percent) of 2,4,6-triamino-sym-triazine, (d) between about 0.25 to about 1.0 weight percent (preferably about 0.38 weight percent) of tetrakis(methylene(3,5-di-tert-butyl-4-hydroxyhydrocinnamate)) methane, (e) between about 0.05 to about 0.2 weight percent (preferably about 0.1 weight percent) of calcium 12-hydroxystearate, and (f) between about 0.1 to about 0.3 weight percent (preferably about 0.2 weight percent) of N-N'-ethylenebisstearamide.

Another particularly preferred composition according to this invention comprises, based upon the total weight of the composition, (a) greater than about 95 weight percent (preferably about 99 weight percent) of polyoxymethylene, (b) between about 0.01 to about 0.1 weight percent (preferably about 0.02 weight percent) of 3 salicyloylamido-1,2,4 triazole or tris-2- tert.butyl-4-thio-(2'methyl-4'hydroxy-5'tert.butyl) phenyl-5-methyl phenyl phosphite, (c) between about 0.25 to about 1.0 weight percent (preferably about 0.5 weight percent) of 1,6 hexamethylene bis(3,5-di-t-butyl-4-hydroxy hydrocinnamate) (Irganox 259), (d) between about 0.05 to about 0.2 weight percent (preferably about 0.1 weight percent) of calcium 12-hydroxystearate, and (e) between about 0.1 to about 0.3 weight percent (preferably about 0.2 weight percent) of N-N'-ethylenebisstearamide.

Blends of the present invention may include approximately 1 to 50 weight percent (based upon the total weight of the composition) of filler materials. Representative filler materials include calcium carbonate, calcium silicate, silica, clays, talc, mica, polytetrafluoroethylene, graphite, alumina, trihydrate, sodium aluminum carbonate, barium ferrite, pigments, etc.

Approximately 1 to 60 weight percent, (based upon the total weight of the composition) of reinforcing agents may also be blended with the compositions of this invention. Specific examples of such reinforcing materials include glass fibers, graphitic carbon fibers, amorphous carbon fibers, synthetic polymeric fibers, aluminum fibers, titanium fibers, steel fibers, tungsten fibers, and ceramic fibers, to name just a few.

The additives may be mixed with the polyoxymethylene in any expedient fashion. For example, the additives and polyoxymethylene may be mixed by dry-blending in a high intensity mixer followed by melt extrusion and pelletizing; by milling between two heated rolls and chopping into molding granules; or by milling in a Banbury Mixer or a Brabender Plastograph.

As an alternative, the additives may be mixed with a polyoxymethylene by dissolving both the polymer and the additives in a common solvent and, thereafter, evaporating the solution to dryness. Or, the additives may be mixed intimately with a polyoxymethylene by being applied in solution in a suitable solvent to the finely divided solid polyoxymethylene followed by evaporation of the solvent.

The polyoxymethylene molding compositions of the present invention may be natural in color or may include various color pigments which are compatible with polyoxymethylene. For example, red pigments such as azo dye and cadmium sulphide-cadmium selenide reds and "Mercadium" reds, blue pigments such a phthalocyanine blues, green pigments such as chromium oxide greens, white pigments such as titanium dioxide whites, and black pigments such as carbon blacks may be incorporated in the compositions of the present invention in amounts of up to about 5% by weight, based on the total weight of the composition.

The invention will be further illustrated by way of the following examples, which are to be considered to be illustrative only, and non-limiting. The various analyses referred to in the Examples were conducted as follows:

HUNTER COLOR—Hunter color is a standard color measurement procedure used for testing colored and natural plastic materials. A two inch disk was molded for the measurement. This disk was inserted in a calibrated Hunter Colorimeter set in the reflectance mode. A Hunter Color parameter (b) was obtained which defines the brightness and color of the disk.

EXTRACTABLE FORMALDEHYDE—Extractable formaldehyde was measured by boiling 100 grams of sample in 100 ml distilled water at reflux for 60 minutes. The extract was then neutralized with potassium hydroxide (0.1N) solution and the final pH was noted. Fifty milliliters of sodium sulfite (0.1N) solution was added to the extract. This final solution was then titrated with sulfuric acid (0.1N) to the original pH level noted previously. An extractable formaldehyde value was calculated from the following formula:

% extractable formaldehyde = $(T \times N \times 3)/W$ where

T = milliliters of sulfuric acid
N = normality of sulfuric acid
W = exact sample weight in grams.

THE THERMAL DEGRADATION RATE OF THE POLYMER ($K_{D230}$)—The thermal degradation rate of the polymer was measured by determining the percent weight loss of a sample of the polymer heated in an open vessel in a circulating air oven at 230° C. For example, the $K_{D230}$ (also referred to herein as Kd) of an unstabilized oxymethylene copolymer of trioxane and ethylene oxide, which was subjected to hydrolysis to remove unstable end groups, is well over 1 percent per minute and generally results in a complete loss after 45 minutes at 230° C.

EXAMPLES

Polyoxymethylene molding compositions were prepared comprising a polyacetal molding resin (polyoxymethylene) commercially available from Hoechst Celanese Corporation under the tradename Celcon ®. The compositions included typical polyoxymethylene molding composition components as well as various additives to determine the effect of such additives upon the color stability, thermal degradation, and extractable formaldehyde of the molding compositions, with the following ingredients and additives being employed in various combinations:

A. Metal Deactivators 3 salicyloyl-amido-1,2,4 triazole—Witco Corporation, Argus Division, MARK 1475 tris-2-tert.butyl-4-thio-(2'methyl-4'hydroxy-5'tert.butyl) phenyl-5-methyl phenyl phosphite—Hoechst Celanese, Hostanox VPOSP 1

B. Acid Scavenger calcium 12-hydroxystearate—Kosei Co., Ltd., CS-6 (noted below as Calcium OH Stearate)

C. Antioxidants tetrakis(methylene(3,5-di-tert-butyl-4-hydroxyhydrocinnamate))methane—Ciba Geigy, Irganox 1010

1,6 hexamethylene bis(3,5-di-t-butyl-4-hydroxy hydrocinnamate)—Ciba Geigy, Irganox 259

1,2-bis(3,5-di-tert-butyl-4-hydroxyhydrocinnamoyl)-hydrazine—Ciba Geigy, Irganox MD1024

D. Formaldehyde Scavenger 2,4,6-triamino-sym-triazine—American Cyanamid, melamine

E. Lubricant

N-N'-ethylenebisstearamide—Glyco Chemical, Acrawax C

F. Other Additives

Branched Celcon (polyacetal)—Hoechst Celanese, U10-01—(a suitable nucleant)

Polyethylene glycol—Union Carbide, Carbowax 3350

Glyceryl Monostearate—Protameen Chemicals, Inc., GMS-450

Ethylenediamine tetraacetic acid—Aldrich, EDTA 2,2'oxamido bis-[ethyl 3-(3,5 di tert butyl-4-hydroxy phenyl) propionate—Uniroyal, Naugard XL-1 citric acid—Aldrich, Citric Acid

COMPARATIVE EXAMPLES 1-9 AND EXAMPLES A-D

Polyacetal molding compositions were prepared by preblending virgin acetal copolymer with the additives according to the formulations presented in Table I and Table III (wherein the novel compositions of the present invention are denoted as Examples A-D), in a high intensity mixer. The dry blend was extruded on a single-screw extruder at 190° C. and 75 rpm, and pelletized. The pelletized samples were then injection molded into test plaques on a reciprocating screw machine at 195° C.

All compositions contained polyoxymethylene (solution hydrolysis copolymer), calcium hydroxystearate, an antioxident, and a lubricant. The molded test samples were subjected to Thermal Degradation (Kd), Extractable Formaldehyde, and Hunter Color evaluations. The results are summarized in Table II and Table IV. The degree of discoloration of the respective molding compositions is quantified as the Hunter Color b value at time zero (initial stage at room temperature) or after aging at set temperatures (e.g., seven days at 113° C., or five days at 116° C.). As noted in the following tables, the compositions of the present invention comprising the MARK 1475 or Hostanox VPOSP1 metal deactivators (Examples A-D) were extremely effective at preventing discoloration as demonstrated by the superior aged Hunter Color b values.

TABLE I

| INGREDIENTS (WT. %) | FORMULATIONS | | | | | | |
|---|---|---|---|---|---|---|---|
| | 1 | 2 | 3 | 4 | 5 | A | B |
| Polyoxymethylene | 99.2 | 99.2 | 99.2 | 99.2 | 99.2 | 99.2 | 99.2 |
| Irganox 259 | .5 | .5 | .5 | .5 | .5 | .5 | .5 |
| Calcium OH Stearate | .1 | .1 | .1 | .1 | .1 | .1 | .1 |
| Acrawax C | .2 | .2 | .2 | .2 | .2 | .2 | .2 |
| MD 1024 | .03 | | | | | | |
| EDTA | | .03 | | | | | |
| Naugard XL-1 | | | .03 | | | | |
| Citric Acid | | | | .03 | | | |
| MARK 1475 | | | | | | .03 | |
| Hostanox VPOSP1 | | | | | | | .03 |

TABLE II

| Formulations | Metal Deactivator | PROPERTIES | | | Hunter Color, b value | |
|---|---|---|---|---|---|---|
| | | Ext. Form. % | Kd. %/Min. | Initial | 113° C. 7 days | Δb |
| 1 | MD 1024 | .004 | .029 | 3.8 | 15.6 | 11.8 |

TABLE II-continued

| Formulations | Metal Deactivator | Ext. Form. % | Kd. %/Min. | Initial | Hunter Color, b value 113° C. 7 days | Δb |
|---|---|---|---|---|---|---|
| 2 | EDTA | .004 | .032 | 3.4 | 18.1 | 14.7 |
| 3 | Naugard XL1 | .005 | .022 | 3.3 | 22.5 | 19.2 |
| 4 | Citric Acid | .081 | .060 | 4.3 | 31.7 | 27.4 |
| 5 | Control | .005 | .019 | 2.8 | 18.7 | 15.9 |
| A | MARK 1475 | .004 | .016 | 3.3 | 7.2 | 3.9 |
| B | Hostanox VPOSP1 | .004 | .028 | 2.3 | 7.5 | 5.2 |

TABLE III

| INGREDIENTS (WT. %) | 6 | 7 | 8 | 9 | C | D |
|---|---|---|---|---|---|---|
| Polyoxymethylene | 96.92 | 96.92 | 96.92 | 96.92 | 96.92 | 96.92 |
| Irganox 1010 | 0.40 | 0.32 | 0.20 | 0.38 | 0.38 | 0.38 |
| Acrawax C | 0.20 | 0.20 | 0.20 | 0.20 | 0.20 | 0.20 |
| U10-01 | 1.10 | 1.10 | 1.10 | 1.10 | 1.10 | 1.10 |
| Calcium OH-Stearate | 0.10 | 0.10 | 0.10 | 0.10 | 0.10 | 0.10 |
| Melamine | 0.04 | 0.04 | 0.04 | 0.04 | 0.04 | 0.04 |
| Carbowax 3350 | 0.90 | 0.90 | 0.90 | 0.90 | 0.90 | 0.90 |
| GMS-450 | 0.36 | 0.36 | 0.36 | 0.36 | 0.36 | 0.36 |
| MD1024 | — | 0.08 | 0.20 | 0.02 | — | — |
| MARK 1475 | | | | | 0.02 | |
| Hostanox VPOSP1 | | | | | | 0.02 |

TABLE IV

Aging In 116° C. Oven, Effect of Stabilizers

| Formulation | Initial | Hunter Color, b value 116° C., 5 days | Δb |
|---|---|---|---|
| 6 | 6.5 | 22.5 | 16.0 |
| 7 | 6.4 | 17.5 | 11.1 |
| 8 | 6.4 | 17.0 | 10.6 |
| 9 | 6.7 | 22.0 | 15.3 |
| C | 6.4 | 12.5 | 6.1 |
| D | 7.2 | 14.5 | 7.3 |

The above data in Tables I–IV demonstrates the effectiveness of employing a metal deactivator such as 3-salicyloylamido-1,2,4 triazole or tris-2-tert.- butyl-4-thio-(2'methyl-4'hydroxy-5'tert.butyl) phenyl-5-methyl phenyl phosphite along with calcium hydroxystearate to suppress discoloration in the polyoxymethylene molding compositions of this invention. The enhanced color stability property of the compositions of the present invention is especially evident from the difference in Hunter Color b values over time at elevated temperatures. That is, the compositions of the present invention exhibit an increase in Hunter Color b value (Δb) of less than about 8.0 after about seven days at about 113° C. over the initial (room temperature, i.e., about 21° C.) Hunter Color b value of the compositions.

For example, as can be seen in the Tables, the Δb for the exemplary compositions of the present invention (Examples A, B, C, and D) is 3.9, 5.2, 6.1, and 7.3, respectively. A Δb value of less than about 8.0 indicates good color stabilization.

Therefore, while the invention has been described in connection with what is presently considered to be the most practical and preferred embodiments, it is to be understood that the invention is not to be limited to the disclosed embodiments, but on the contrary is intended to cover various modifications and equivalent compositions included within the spirit and scope of the appended claims.

What is claimed is:

1. A polyoxymethylene molding composition exhibiting ambient and heat aged color stability comprising a polyoxymethylene resin, from about 0.001 to 1.0 weight percent based on the total weight of the composition of calcium hydroxystearate, and from about 0.01 to 1.0 weight percent based on the total weight of the composition of at least one metal deactivator selected from the group consisting of 3-salicyloylamido-1,2,4-triazole and tris-2-tert.butyl-4-thio-(2'methyl-4'hydroxy-5'tert.butyl) phenyl-5-methyl phenyl phosphite sufficient to achieve an increase in Hunter Color b value of the resulting polyoxymethylene molding composition of less than about 8.0 after about seven days at about 113° C. over the initial Hunter Color b value of the composition at time zero at about 21° C.

2. A molding composition as in claim 1 wherein said polyoxymethylene resin is derived from copolymerizing trioxane with a cyclic ether having at least two adjacent carbon atoms.

3. A molding composition as in claim 1 wherein said polyoxymethylene resin is derived from polymerizing anhydrous formaldehyde.

4. A molding composition as in claim 1 wherein said color stabilizing effective amount of at least one metal deactivator is less than about 1.0 weight percent, based on the total weight of the composition.

5. A molding composition as in claim 1 wherein said color stabilizing effective amount of at least one metal deactivator is less than about 0.1 weight percent, based on the total weight of the composition.

6. A molding composition as in claim 1 wherein said color stabilizing effective amount of at least one metal deactivator is between about 0.01 to about 0.05 weight percent, based on the total weight of the composition.

7. A molding composition as in claim 1 wherein said polyoxymethylene resin is present in an amount greater than about 95 weight percent, based on the total weight of the composition.

8. A molding composition as in claim 1 wherein said calcium hydroxystearate is present in an amount less than 1.0 weight percent, based on the total weight of the composition.

9. A molding composition as in claim 1 wherein said calcium hydroxystearate is present in an amount less than 0.15 weight percent, based on the total weight of the composition.

10. A molding composition as in claim 1 wherein said calcium hydroxystearate is present in an amount between about 0.15 and about 0.05 weight percent, based on the total weight of the composition.

11. A molding composition as in claim 1 further comprising a colorant in an amount sufficient to impart a desired color to the molding composition.

12. A molding composition as in claim 1 further comprising an antioxidant.

13. A molding composition exhibiting ambient and heat aged color stability comprising, based on the total weight of the composition:
   (a) an oxymethylene copolymer;
   (b) between about 0.01 to about 0.1 weight percent of at least one metal deactivator selected from the group consisting of 3 salicyloylamido-1,2,4-triazole and tris-2-tert.-butyl-4-thio-(2'methyl-4'hydroxy-5'tert.butyl) phenyl-5-methyl phenyl phosphite;
   (c) between about 0.05 to about 0.2 weight percent calcium hydroxystearate;
   (d) between about 0.25 to about 1.0 weight percent of one antioxidant selected from the group consisting of tetrakis (methylene(3,5-di-tert.-butyl-4-hydroxyhydrocinnamate)) methane and 1,6 hexamethylene bis(3,5-di-t-butyl-4-hydroxy hydrocinnamate).

14. A molding composition as in claim 13 further comprising between about 0.1 to about 0.3 weight percent of N-N'-ethylenebisstearamide.

15. A molding composition as in claim 13 further comprising a colorant in an amount sufficient to impart a desired color to the molding composition.

16. A molding composition as in claim 13 further comprising between about 0.015 to about 0.4 weight percent of 2,4,6-triamino-sym-triazine.

17. A molding composition as in claim 13 wherein said component (a) is present in an amount greater than about 95 weight percent.

18. A molding composition as in claim 13 wherein said component (b) is present in an amount between about 0.02 to about 0.03 weight percent.

19. A molding composition as in claim 13 wherein said component (c) is present in an amount of about 0.1 weight percent.

20. A molding composition as in claim 13 wherein said component (d) is present in an amount between about 0.3 to about 0.5 weight percent.

21. A molding composition as in claim 13 wherein components (b), (c), and (d) are present in an amount totaling less than 1.0 weight percent.

22. A molding composition as in claim 13 which further comprises at least one component selected from fillers, lubricants, scavengers, and reinforcing agents.

23. A molding composition as in claim 13 having an increase in Hunter Color b value of less than about 8.0 after about seven days at about 113° C. over the initial Hunter Color b value of the composition at time zero at about 21° C., and a Kd degradation rate of no greater than 0.028.

24. A molded part exhibiting ambient and heat aged color stability consisting essentially of a composition which comprises the following components, based upon the total weight of the composition:
   (a) an oxymethylene copolymer;
   (b) between about 0.01 to about 0.1 weight percent of at least one metal deactivator selected from the group consisting of 3 salicyloylamido-1,2,4-triazole and tris-2-tert.-butyl-4-thio-(2'methyl-4'hydroxy-5'tert.butyl) phenyl-5-methyl phenyl phosphite;
   (c) between about 0.05 to about 0.2 weight percent calcium hydroxystearate;
   (d) between about 0.25 to about 1.0 weight percent of one antioxidant selected from the group consisting of tetrakis (methylene(3,5-di-tert.-butyl-4hydroxyhydrocinnamate)) methane and 1,6 hexamethylene bis(3,5-di-t-butyl-4-hydroxy hydrocinnamate).

25. A molded part as in claim 24 wherein said component (a) is present in an amount greater than about 95 weight percent.

26. A molded part as in claim 24 wherein said component (b) is present in an amount between about 0.02 to about 0.03 weight percent.

27. A molded part as in claim 24 wherein said component (c) is present in an amount of about 0.1 weight percent.

28. A molded part as in claim 24 wherein said component (d) is present in an amount between about 0.3 to about 0.5 weight percent.

* * * * *

UNITED STATES PATENT AND TRADEMARK OFFICE
CERTIFICATE OF CORRECTION

PATENT NO. : 5,096,951

DATED : March 17, 1992

INVENTOR(S) : Andrew Auerbach

It is certified that error appears in the above-identified patent and that said Letters Patent is hereby corrected as shown below:

Column 4, line 55, delete "Teey" and insert --They--.

Signed and Sealed this

Fourth Day of May, 1993

Attest:

MICHAEL K. KIRK

Attesting Officer

Acting Commissioner of Patents and Trademarks